US007706654B2

(12) United States Patent
Peng et al.

(10) Patent No.: US 7,706,654 B2
(45) Date of Patent: Apr. 27, 2010

(54) INTEGRATED DEVICE FOR HEAT ASSISTED MAGNETIC RECORDING

(75) Inventors: Chubing Peng, Allison Park, PA (US); Xuhui Jin, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 11/934,908

(22) Filed: Nov. 5, 2007

(65) Prior Publication Data
US 2009/0116804 A1 May 7, 2009

(51) Int. Cl.
G02B 6/10 (2006.01)
G11B 7/135 (2006.01)

(52) U.S. Cl. .......................... 385/131; 385/31; 385/43; 369/112.27

(58) Field of Classification Search ................ 385/131, 385/43, 31; 369/112.27
See application file for complete search history.

(56) References Cited

U.S. PATENT DOCUMENTS

| | | | |
|---|---|---|---|
| 4,994,818 A | 2/1991 | Keilmann | |
| 5,004,307 A | 4/1991 | Kino et al. | |
| 5,272,330 A | 12/1993 | Betzig et al. | |
| 5,982,716 A * | 11/1999 | Kino et al. | ............. 369/14 |
| 6,055,220 A | 4/2000 | Mamin et al. | |
| 6,320,708 B1 * | 11/2001 | Ueyanagi et al. | ........ 359/824 |
| 6,914,999 B2 * | 7/2005 | Breukelaar et al. | ......... 385/20 |
| 6,999,384 B2 * | 2/2006 | Stancil et al. | ........ 369/13.32 |
| 7,215,629 B2 * | 5/2007 | Eppler | ............ 369/112.27 |
| 7,272,079 B2 | 9/2007 | Challener | |
| 7,538,978 B2 * | 5/2009 | Sato et al. | ............. 360/128 |
| 2001/0004348 A1 | 6/2001 | Ueyanagi | |
| 2004/0001394 A1 | 1/2004 | Challener et al. | |
| 2004/0001420 A1 | 1/2004 | Challener | |
| 2005/0041950 A1 | 2/2005 | Rottmayer et al. | |
| 2005/0078565 A1 | 4/2005 | Peng et al. | |
| 2006/0182393 A1 | 8/2006 | Sendur et al. | |
| 2007/0115787 A1 | 5/2007 | Itagi et al. | |
| 2008/0151360 A1 * | 6/2008 | Stipe | ............... 359/350 |

OTHER PUBLICATIONS

W. Challener et al., "Miniature Planar Solid Immersion Mirror With Focused Spot Less Than a Quarter Wavelength," Optics Express, vol. 13, Issue 18, Sep. 2005, pp. 7189-7197.

* cited by examiner

Primary Examiner—Frank G Font
Assistant Examiner—Guy G Anderson
(74) Attorney, Agent, or Firm—Robert P. Lenart, Esq.; Pietragallo Gordon Alfano Bosick & Raspanti, LLP

(57) ABSTRACT

An apparatus includes a first waveguide configured to focus an electromagnetic wave to a focal region, and a second waveguide to further condense the light to an optical spot. The second waveguide includes a metallic structure defining an opening having one end positioned adjacent to the focal region and a multilayer structure positioned in the opening, the multilayer structure including a first layer of dielectric material, and second and third layers of dielectric material positioned on opposite sides of the first layer. A layer of lower index of refraction than that of the first dielectric layer may be positioned adjacent to the inner walls of the opening in the second waveguide to efficiently excite surface plasmons, and propagate them with low loss.

15 Claims, 4 Drawing Sheets

INTEGRATED DEVICE FOR HEAT ASSISTED MAGNETIC RECORDING

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

In thermally assisted magnetic/optical recording, information bits are recorded on a storage layer at elevated temperatures, and a heated area in the storage layer determines the data bit dimensions. One approach uses a planar solid immersion mirror (PSIM) lens, fabricated on a planar waveguide and a metallic nano-structure of a specific shape, called a near-field optical transducer, placed near the PSIM focus. The PSIM directs light onto the near-field transducer to form a local surface plasmon (LSP). A high electric field surrounding the near-field transducer appears, due to collective oscillations of electrons in the metal. Part of this field will tunnel into an adjacent storage medium and get absorbed, raising the temperature of the medium locally for recording. The LSP is sensitive to the shape of the near-field transducer and its location in the waveguide. The near-field transducer may be buried in a dielectric layer of low thermal dissipation. Light is absorbed in the near-field transducer, creating heat that requires a cooling mechanism for its functioning.

SUMMARY

In one aspect, the invention provides an apparatus including a first waveguide configured to focus an electromagnetic wave to a focal region, and a second waveguide including a metallic structure defining an opening having one end positioned adjacent to the focal region and a multilayer structure positioned in the opening, the multilayer structure including a first layer of dielectric material, and second and third layers of dielectric material positioned on opposite sides of the first layer.

In another aspect, the invention provides an apparatus including means for focusing an electromagnetic wave to a focal region, and a waveguide including a metallic structure defining an opening having one end positioned adjacent to the focal region of the first waveguide and a multilayer structure positioned in the opening, the multilayer structure including a first layer of dielectric material, and second and third layers of dielectric material positioned on opposite sides of the first layer.

These and various other features and advantages will be apparent from a reading of the following detailed description.

DETAILED DESCRIPTION OF THE INVENTION

Figure 1:
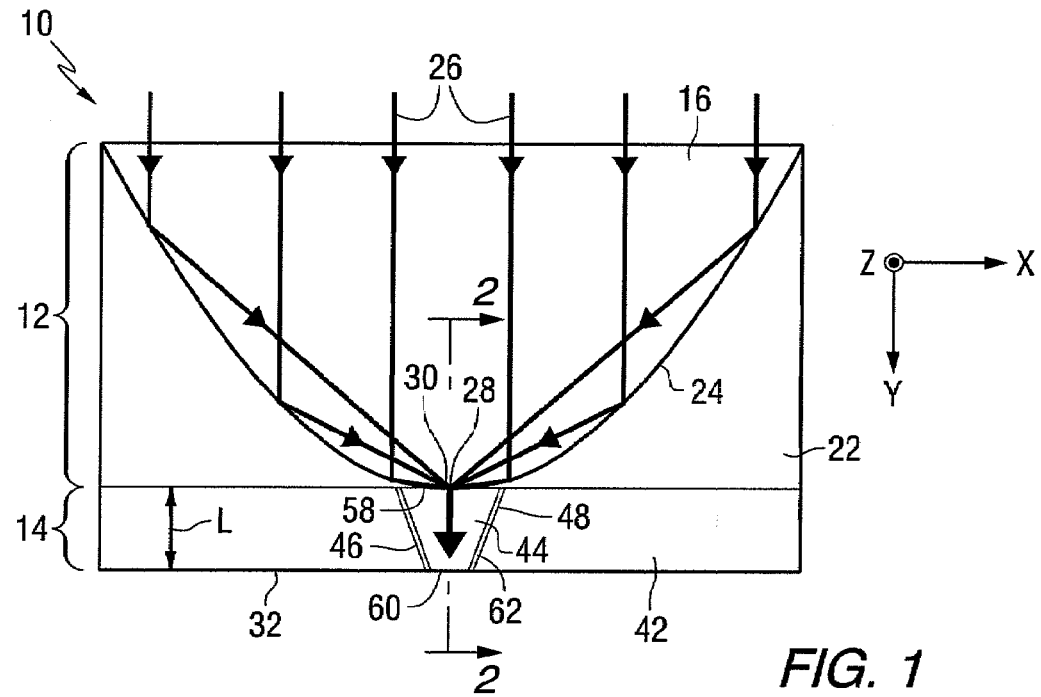
FIG. 1 is a schematic side view of an optical transducer in accordance with an aspect of the invention.
Figure 2:
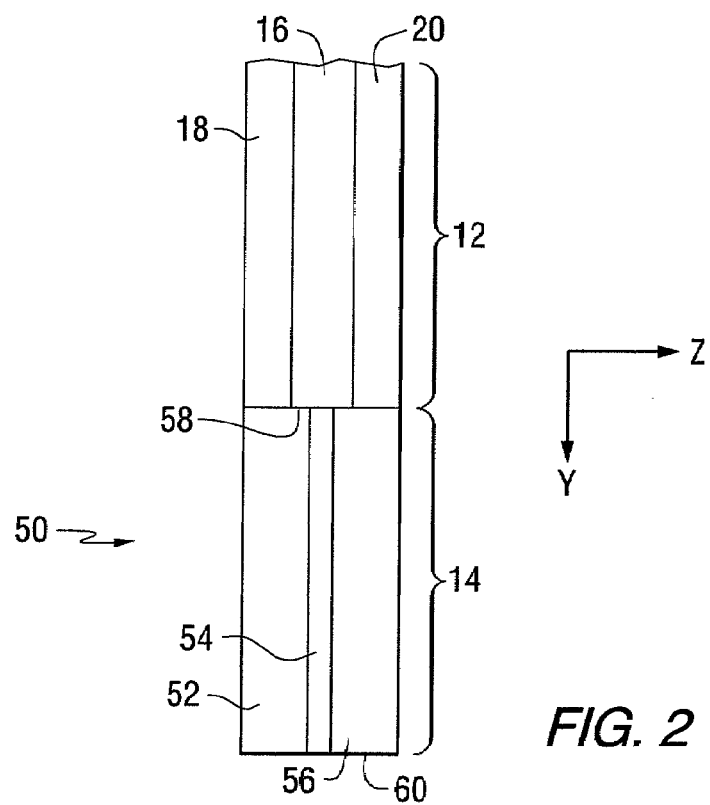
FIG. 2 is a cross-sectional view of the optical transducer of FIG. 1 taken along line 2-2.

FIG. 1 is a schematic cross-sectional view of an optical transducer 10 in accordance with an aspect of the invention. FIG. 2 is a cross-sectional view of a portion of the transducer of FIG. 1 taken along line 2-2. The optical transducer 10 includes two waveguides 12 and 14. In this example, waveguide 12 forms a solid immersion mirror that includes a core or guiding layer 16, which can be, for example, $Ta_2O_5$, $SiN_x$ or ZnS. The core layer is sandwiched between cladding layers 18 and 20, which can be, for example, $Al_2O_3$ or $SiO_2$. A material 22, which can be, for example, air or Al, is positioned adjacent to the sidewalls 24 for reflecting an electromagnetic wave 26 into a focus or focal region 28. The sidewalls are shaped to form an interface normal to the waveguide plane, for condensing the electromagnetic wave 26, which can be, for example, ultraviolet, infrared or visible light, to the focus or focal region 28 adjacent to an end 30 of the waveguide. For the purposes of this description, this electromagnetic radiation will be referred to as light.

In one example, the sidewalls have a parabolic shape and form a parabolic mirror. Light traveling in the guiding layer is reflected by the parabolic interface and directed to the focus 28.

Waveguide 12 is a planar waveguide where light is coupled into the waveguide and a focusing element is fabricated for focusing the light into a diffraction-limited spot. The propagated waveguide mode is transverse-electric (TE) polarized with the electric field parallel to the waveguide plane. The focusing element in this example is a solid immersion mirror (SIM). However, other types of focusing elements such as a mode-index lens may also be used. Light can be launched into the waveguide 12 in many ways, such as with a grating coupling, using an end-fire technique, using a tapered waveguide, etc.

Figure 3:
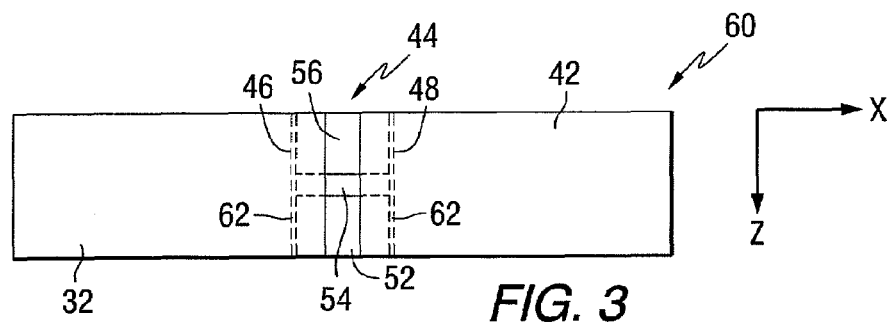
FIG. 3 is a plan view of a portion of an air bearing surface of the optical transducer of FIG. 1.

FIG. 3 is a plan view of a portion of an air bearing surface of the optical transducer of FIG. 1. The optical transducer includes elements that are structured and arranged to condense light 26 to the air bearing surface 32.

The optical transducer of FIGS. 1, 2 and 3 includes two waveguides 12 and 14. Waveguide 12 is a planar waveguide where light is coupled into the waveguide using known techniques. The waveguide 12 is fabricated to focus the light into a diffraction-limited spot in a focal region 28. Waveguide 12 includes a guiding layer 16 positioned between two cladding layers 18 and 20. The cladding layers would have a lower refractive index than the guiding layer. Air may be a suitable cladding layer.

In the example of FIGS. 1, 2 and 3, waveguide 12 serves as a means for focusing the light into a diffraction-limited spot. In one example, the propagated waveguide mode is transverse-electric (TE) polarized with the electric field oriented parallel to the waveguide plane. In this example the waveguide forms a solid immersion mirror. However, other types of focusing elements such as a mode-index lens, or a channel waveguide, may also be used. Light can be launched into the waveguide 12 in many ways, such as with a grating coupler, using an end-fire technique, using a taper, etc.

Waveguide 14 includes a metallic structure 42 that is shaped to define an opening or slot 44. In this example, the walls 46 and 48 of the opening are substantially planar, and converge in a direction toward the surface 32. Thus, the opening 44 is tapered along the Y-direction, which is parallel to the plane of the first waveguide 12. That is, the size of the opening decreases as the distance from the first waveguide increases. The walls lie in planes that are substantially perpendicular to the plane of waveguide 12. Each of the walls is tilted at an angle of between 0° and 60° with respect to the Y-axis.

A multilayer structure 50, including a plurality of layers 52, 54 and 56 of dielectric material stacked in the Z-direction, is positioned within the opening 44. Light directed to the focal region 28 of waveguide 12 enters the opening at a first end 58, and is further concentrated by metallic structure 42 and the multilayer structure 50 to form an optical spot at a second end 60 of the opening. The opening is tapered such that the first end 58 is wider than the second end 60. The full tapering angle of the opening 44 can vary from 0° to about 120°, but an optimal angle might exist to provide the highest efficiency. The dielectric layers 52, 54 and 56 are positioned in planes that are substantially parallel to the plane of the waveguide 12.

The refractive index of the core layer 54 is higher than the refractive index of the cladding layers 52 and 56. Within the opening, light is confined along the Z-direction by the total internal reflection from the outer or cladding layers 52 and 56 of the multilayer structure; and along the X-direction, the light is confined by the walls 46 and 48 of the opening. The width of the opening can be, for example, tens of nanometers at the bottom end 60. For good light transmission efficiency, the opening can be tapered along the beam propagation direction, i.e., the Y-direction, and a thin layer 62 of dielectric material with lower index of refraction than layer 54 may be coated on the inner walls 46 and 48 of the opening. The dielectric material 62 can be optimized to yield sufficient light throughput to, and confinement at, the bottom end 60. Surface plasmon polaritons can be excited at the surface of the walls of the metallic structure, and propagate with low loss at the interface between the metal walls of the slot and the layer 62. The metal can be, for example, gold, silver, or copper.

The necessity of the thin layer 62 depends on the core material 54 used in waveguide 14 and the light wavelength ($\lambda$). Surface plasmons (SP) are well known electromagnetic waves that propagate along the interface between a dielectric material of relative permittivity $\in_d$ and a metal of relative permittivity $\in_m$, respectively. The conditions for the existence of a SP are TM polarization (magnetic field parallel to the interface) and $\in_d + \in_m < 0$. For example, with the Drude model for metals of free electrons $\in_m = 1 - \omega_p^2/\omega^2$, where $\omega_p$ is the bulk plasma frequency and $\omega$ is the angular frequency, the condition $\in_d + \in_m < 0$ leads to a high frequency cutoff at $\omega_c = \omega_p/\sqrt{1 + \in_d}$. For silver and gold, $\omega_p = 3.8$ eV. If silicon is used as the core material 54, $\in_d = 13.54$ at $\lambda = 830$ nm, which leads to a short-wavelength cut-off $\lambda_c = 1.24$ µm. If $\lambda = 830$ nm, there will be no SP propagating at the silicon/gold interface. One way to surmount it is to insert a thin layer of dielectric material of a low index of refraction $\in_1$ between the metal surface and the material of high index, which leads to $\omega_c \to \omega_p/\sqrt{1 + \in_1}$. For instance, $\in_1 = 2.13$ for silica, $\lambda_c \geq 0.58$ µm. In this way, a SP can propagate at waveguide 14 with a silicon core at $\lambda = 0.83$ µm with low loss.

Waveguide 14 may be constructed using the same dielectric materials as used in waveguide 12, or the materials may be optimized to provide sufficient confinement within waveguide 14 along the Z-direction.

The two waveguides 12 and 14 may be stacked on one another. Light may be delivered to waveguide 14 from waveguide 12 by evanescent wave coupling. Since waveguide 14 is short in the Y-direction, a material having a high index of refraction but with slight absorption can be used as the core layer of the multilayer structure, for instance, silicon, $Cu_2O$, SiC, GaP, and chalcogenide glasses. In another example, waveguide 14 may be positioned such that the focus of waveguide 12 is inside waveguide 14 to achieve a more tightly focused beam at the bottom 60 of the opening 44 and enhance transmission efficiency.

The waveguide 14 may use thick metal walls along the X-direction, which provides a heat dissipation channel to remove heat caused by light absorption in the slot waveguide. If the transducer is used in a magnetic recording head, a magnetic pole for magnetic recording may be integrated with the transducer from the Z-direction, or from the X-direction, such that a tip of the pole is near the end 60 of the slot 44.

The narrow metallic opening confines the light in the X-direction and also provides a higher effective guiding index than if there were no slot, which confines the light tighter along the Z-axis and provides a sharp electric field gradient at the opening of the slot, where a magnetic pole may be placed for writing sharp transition to an adjacent magnetic storage medium.

The metallic structure of waveguide 14 provides a tapered plasmonic slit. Along the Z-direction, light is confined by refractive index guiding; along the X-direction, light is confined by an opening formed by the tapered metallic walls of the slot with a nanometer scale separation at the end. Regardless of how narrow the wall separation is, there exists a propagating TM mode, with the electric field substantially normal to the metal walls.

Figure 4:
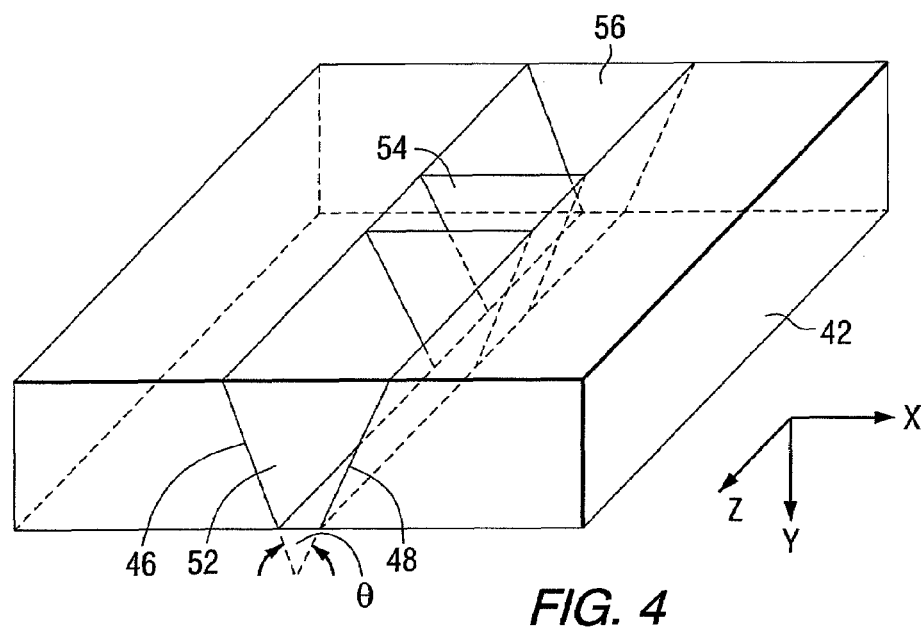
FIG. 4 is an isometric view of elements of the optical transducer of FIG. 1.

FIG. 4 is an isometric view of portions of the waveguide 14 of FIG. 1. The angle $\theta$ between the walls of the opening can be in the range of 0° to about 120°.

Figure 5:
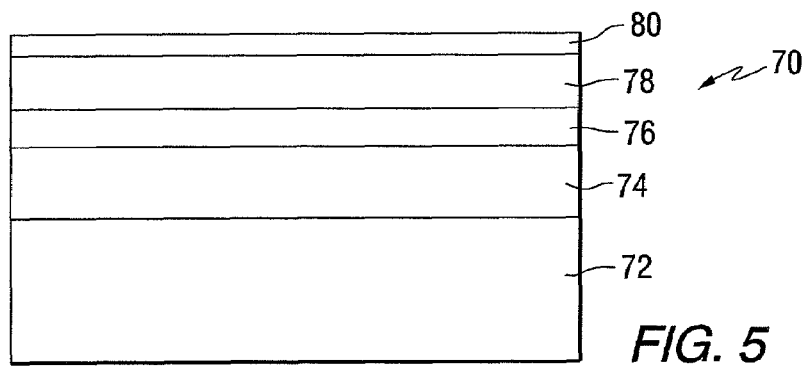
FIG. 5 is a side view of a storage medium that is used to model the performance of an optical transducer.

FIG. 5 is a side view of a storage medium 70 that was used to evaluate the performance of an optical transducer. The storage medium includes a substrate 72, a heat sink layer 74, a thermal barrier layer 76, a magnetic storage layer 78, and a dielectric layer 80. In one example, the dielectric layer 80 may include an overcoat layer such as a diamond-like coating (DLC) on the air bearing surface 32 of the transducer and a lubricating layer on the medium. The magnetic storage layer can be a cobalt-based alloy, the thermal barrier layer can be $ZrO_2$ or $SiO_2$, the heat sink layer can be copper or gold, and the substrate can be glass or silicon.

To assess the performance of transducers according to various aspects of the invention, examples of such transducers have been modeled. In the following examples, a solid immersion mirror (SIM) was assumed to focus light onto the waveguide 14. The SIM had a 50 µm opening at the top of FIG. 1, and a 6.2 µm ending at the interface between waveguides 12 and 14.

The optical power of the incident beam was assumed to be 1 watt. A magnetic medium included a 8 nm thick dielectric layer (n=1.5), a 15 nm thick cobalt layer, a 10 nm thermal barrier layer, and a gold heat sink layer coated on a glass substrate.

In one example, both waveguide 12 and 14 used silicon as the core layer and alumina ($Al_2O_3$) as the cladding layers. At a light wavelength of $\lambda = 980$ nm, Si has an index of refraction n=3.67 with a low absorption coefficient ($\sim 5 \times 10^{-4}$). For $Al_2O_3$ cladding layers, n=1.65 is assumed. At a core thickness of 75 nm, the fundamental TE waveguide mode has a propagation constant=2.54953.

Gold was used as the metallic cladding material in waveguide 14, with n=0.248+i6.669. The metal taper was set to have a 30 nm wide opening at the air bearing surface 32 and a 210 nm wide opening at the top 58. The slot was 147 nm long. A 10 nm $SiO_2$ layer was coated on the metal walls of the tapered slot. The full angle $\theta$ between the walls was 71°.

The electric field strength and absorption in the middle plane of the storage layer have been computed. The modeling shows that both the electric field strength and light absorption are confined to a spot with full-width-at-half-maximum FWHM=(47 nm, 110 nm). The 47 nm dimension is the FWHM along the X-direction and the 110 nm dimension is along the Z-direction. The total absorption in the 15 mm storage layer was calculated to be 24%.

For comparison, the computation was also carried out for a case without waveguide 14. The FWHM spot size was found to be (178 nm, 130 nm) and total absorption, including the sidelobes, in the storage layer is 42%. This means that waveguide 14 compresses the SIM focused spot by a factor of 4.4 with an efficiency of 57%.

Another example used two waveguides having different core materials and thickness. In this case, the assumed light wavelength $\lambda$=660 nm. Waveguide 12 used a $Ta_2O_5$ core layer of 100 nm thickness with n=2.20, while waveguide 14 used a Si core layer of 50 nm thickness, with n=3.837+i0.016. Both waveguides used alumina for cladding layers, n=1.65. The two waveguides are joined at the SIM focal plane. Silver was used as the metallic cladding material for waveguide 14, n=0.14+i4.2. Alternatively, gold could have been used.

The slot was set to have a 30 nm wide opening at the air bearing surface 60 and a 210 nm wide opening at the interface between the two waveguides 12 and 14. The slot was 147 nm long. A 10 nm thick $SiO_2$ layer was coated on the inner walls 46 and 48 of the tapered slot. The full angle $\theta$ between the two walls was 710.

Again the electric field and absorption at the middle plane of the storage layer were modeled. The modeling showed that both the electric field strength and the light absorption were confined to a spot with FWHM=41 nm along the X-direction and 71 nm along the Z-direction. The total absorption in the storage layer reached 20%.

For comparison, the computation was also carried out for a case without waveguide 14. The FWHM spot size was found to be 142 nm along the X-direction and 155 nm along the Z-direction. The total absorption, including the sidelobes, was 42%. For this example, waveguide 14 compresses the SIM focused spot by a factor of 7.5, with the light delivery efficiency of 47%.

Another example assumed that the tapered slot had a 30 nm wide opening at the bottom surface 32 and a 160 nm wide opening at the top 58. The slot was 130 nm long. A 10 nm thick $SiO_2$ layer was coated on the inner walls 46 and 48 of the metal. The full angle between the walls was decreased to 53°.

In this case, the FWHM spot size was calculated to be 43 nm along the X-direction by 75 nm along the Z-direction, which was slightly larger than with the 710 taper. But the light transmission efficiency was improved. The absorption in the storage layer increased to 25%. This means that the waveguide 14 compresses the SIM focused spot by a factor of 6.8 with an efficiency of 61%.

Figure 6:
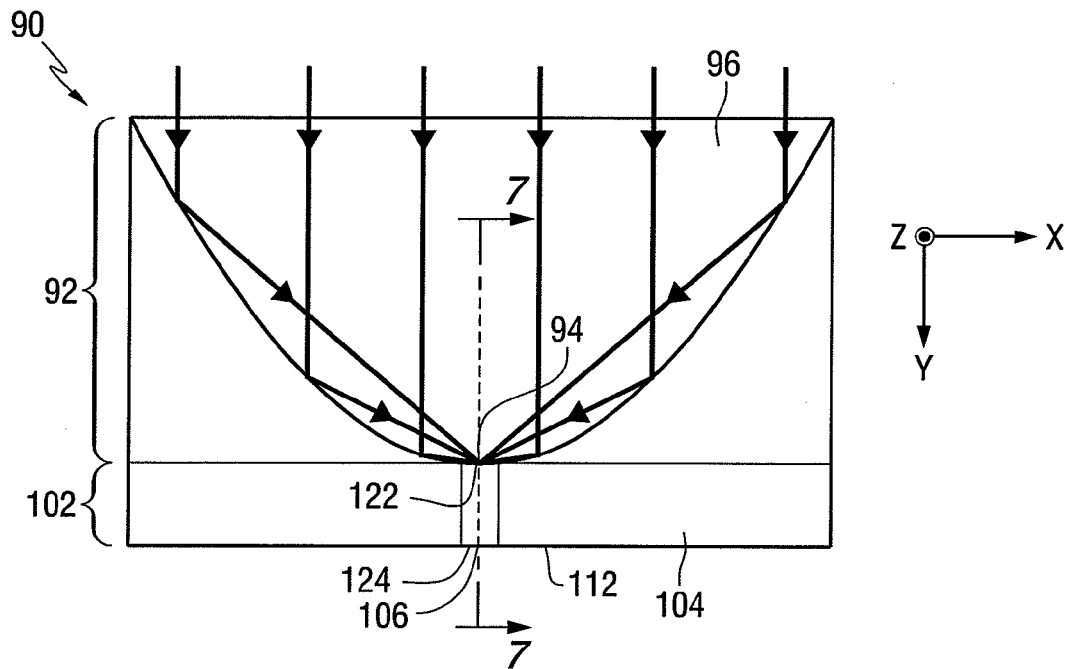
FIG. 6 is a schematic side view of an optical transducer in accordance with another aspect of the invention.
Figure 7:
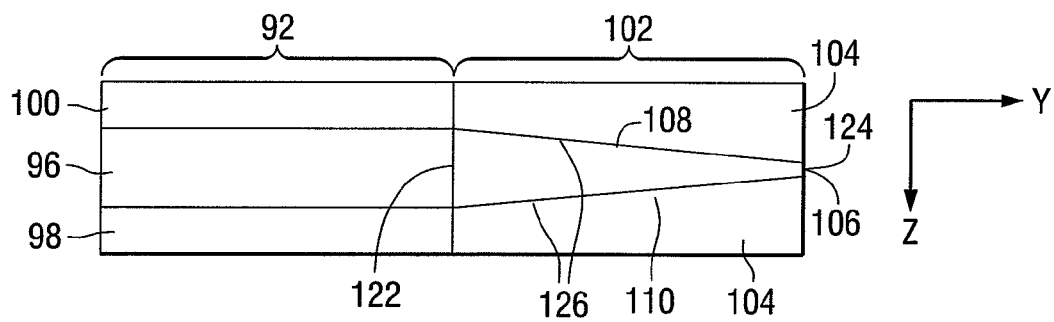
FIG. 7 is a cross-sectional view of the optical transducer of FIG. 6 taken along line 7-7.
Figure 8:
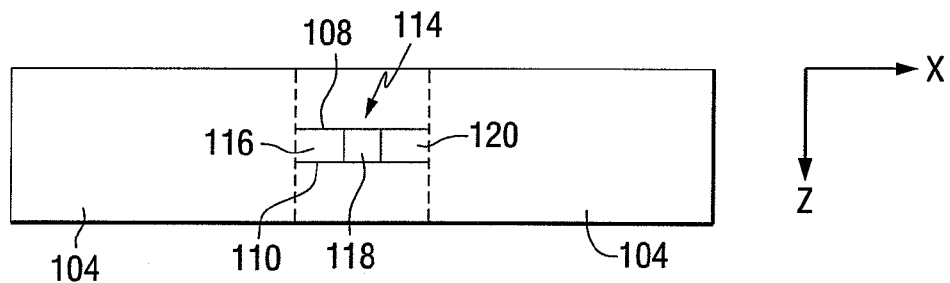
FIG. 8 is a plan view of a portion of an air bearing surface of the optical transducer of FIG. 6.

FIG. 6 is a schematic side view of an optical transducer 90 in accordance with another aspect of the invention. FIG. 7 is a cross-sectional view of the optical transducer of FIG. 6 taken along line 6-6. FIG. 8 is a plan view of a portion of an air bearing surface of the optical transducer of FIG. 6.

In the example of FIGS. 6-8, waveguide 92 is a planar waveguide where light is coupled into the waveguide using known techniques. The waveguide 92 is fabricated to focus the light into a diffraction-limited spot in a focal region 94. Waveguide 92 includes a guiding layer 96 positioned between two cladding layers 98 and 100. The cladding layers would have a lower refractive index than the guiding layer. Air may be a suitable cladding layer.

In the example of FIGS. 6, 7 and 8, waveguide 92 serves to focus the light into a diffraction-limited spot. The waveguide 92 forms a solid immersion mirror. However, other types of focusing elements such as a mode-index lens may also be used. Light can be launched into the waveguide 92 in many ways, such as by using a grating coupling, an end-fire technique, a tapered waveguide, etc.

Waveguide 102 includes a metallic structure 104 that is shaped to define an opening or slot 106. In this example, the walls 108 and 110 of the opening are substantially planar and converge in a direction toward the air bearing surface 112. Thus, the opening 106 is tapered in a plane parallel to the plane of the first waveguide. A multilayer structure 114 including a plurality of layers 116, 118 and 120 stacked in the X-direction is positioned within the opening. The dielectric waveguide layers 116, 118, and 120 in structure 114 of the waveguide 102 are substantially perpendicular to the plane of waveguide 92.

Light directed to the focus 94 of waveguide 92 enters the opening at a first end 122 and is further concentrated by metallic structure 104 and the multilayer structure 114 to form an optical spot at a second end 124 of the opening. The opening is tapered such that the first end 122 is wider than the second end 124 along the Z-direction. The full tapering angle of the opening 106 can vary from 0° to about 120°. Stated another way, each of the walls of the opening can lie in a plane that is tilted with respect to the plane of waveguide 92 at an angle of between 0° and about 60°. In any case, an optimal angle might exist to provide the highest efficiency.

Within the opening, light is confined along the X-direction by the total internal reflection from the outer layers 116 and 120 of the multilayer structure; and along the Z-direction, it is confined by the metal walls 108 and 110 of the opening, which can be tens of nanometers at the bottom end 124. For good light transmission efficiency, the opening can be tapered along the beam propagation direction, i.e., the Y-direction, and a thin layer 126 of dielectric material with lower index of refraction than layer 118 can be coated on the inner walls 108 and 110 of the opening. This dielectric material can be optimized to have good light throughput and confinement along the Z-direction.

Since waveguide 102 is short in the Y-direction, a material having a high index of refraction but with slight absorption can be used as the core layer of the multilayer structure, for instance, silicon. Also, waveguide 102 may be positioned such that the focal plane of waveguide 90 is inside this waveguide to achieve a more tightly focused beam at the bottom of the opening and enhance transmission efficiency.

The metal walls 108 and 110 can be very thick, which provides a heat dissipation channel to remove heat caused by light absorption in the slot waveguide. If the transducer is used in a magnetic recording head, a magnetic pole for magnetic recording may be integrated in this device from the Z-direction, or from the X-direction such that a tip of the pole is near the end 124 of the slot 106.

The narrow metallic opening confines the light in the Z-direction and also provides a higher effective guiding index than if there were no slot, which leads to good confinement along the X-direction and a sharp electric field gradient at the opening of the slot, where a magnetic pole may be placed for writing data with sharp transitions.

Figure 9:
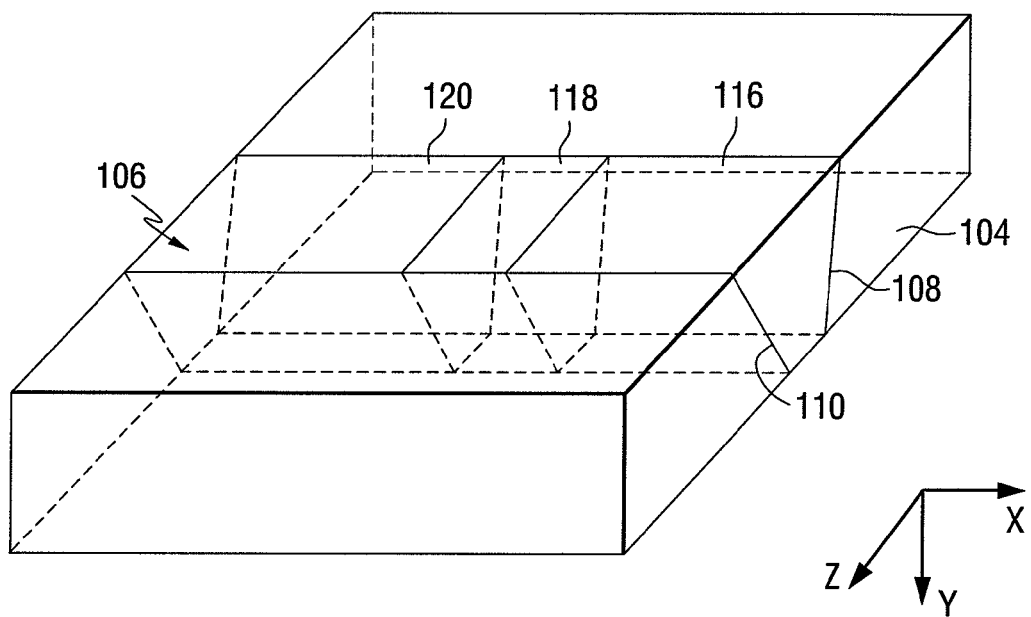
FIG. 9 is an isometric view of elements of the optical transducer of FIG. 6.

Waveguide 102 is a tapered plasmonic slit. Along the X-direction, light is confined by refractive index guiding; along the Z-direction, it is confined by an opening formed by two tapered metallic walls with a nanometer separation at the end. Regardless of how narrow the separation is, there exists a propagating TM mode, with the electric field substantially normal to the metal walls. FIG. 9 is an isometric view of elements of the optical transducer of FIG. 6.

In the example of FIGS. 6-8, the propagation waveguide mode is TM polarized with the electric field perpendicular to the metal walls 108 and 110.

To assess the performance of transducers according to FIGS. 6-8, examples of such transducers have been modeled. In the following examples, a solid immersion mirror (SIM) fabricated in the waveguide 92 focuses light onto waveguide 102. A magnetic storage medium, including a 2.5 nm thick dielectric layer (n=1.25), a 2.5 nm thick lube layer (n=1.3), a 12.5 nm thick cobalt layer, a 10 nm thermal barrier layer, and a gold heat sink layer, was assumed in the following results.

As one example, the first waveguide used $Ta_2O_5$ (n=2.1) as the core material and $Al_2O_3$ (n=1.6) as the cladding material. At a core thickness of 125 nm and a light wavelength of 660 nm, the fundamental TM waveguide mode had a propagation constant=1.7154. Gold was used as the metallic taper material in waveguide 102, with n=0.248+i6.669. The metallic slot taper had a full tapering angle of 90°. The slot was assumed to be 140 nm long, 20 nm wide at the bottom end 124, and 300 nm wide at the top end 122. The second waveguide used the same dielectric materials as the first waveguide, but the thickness of the core layer was chosen to be 50 nm in order to confine light along the X-direction. A 10 nm $SiO_2$ layer 126 was positioned between the sides of the tapered slot and the multilayer structure 114.

The FWHM optical spot size was calculated to be 130 nm along the X-direction and 33 nm along the Z-direction. The total absorption in the 12.5 nm magnetic layer is 8.3%. For comparison, the computation was also carried out for the case without the waveguide 102. The FWHM spot size was found to be 160 nm by 180 nm, and the total absorption in the storage layer, including the sidelobes, is 27.5%. This means that the metallic taper compresses the SIM focused spot by a factor of 6.7 with an efficiency of 30%.

As a second example, the first waveguide was assumed to use silicon (n=3.87) for the core material, and $Ta_2O_5$ (n=2.1) for the cladding material. At a core thickness of 100 nm and a light wavelength of 660 nm, the fundamental TM waveguide mode had an effective index of 2.9116. The metal walls used silver (n=0.14+i4.2), and the tapered slot was filled with silicon. The metallic tapered slot had a full tapering angle of 90°. It was 140 nm long, 20 nm wide at the end 124, and 300 nm wide at the opening 94. A 10 nm $SiO_2$ layer was coated on the inner walls 108 and 126 of the slot between the metal and the dielectric filling.

The electric field strength was computed at a position of 7.5 nm in the magnetic layer with the metallic tapered slot described above. The FWHM optical spot size was found to be 90 nm along the X-direction and 28 nm along the Z-direction. The total absorption in the 12.5 nm magnetic layer was 13.2%. The FWHM spot size in the magnetic medium without the metallic taper was found to be 100 nm by 93 nm, and the total absorption in the storage layer was 34.3%. This means that the metallic tapered slot compresses the SIM focused spot in the medium by a factor of 3.7 with an efficiency of 38%.

The implementations described above and other implementations are within the scope of the following claims.

What is claimed is:

1. An apparatus comprising:
    a first waveguide configured to focus an electromagnetic wave to a focal region; and
    a second waveguide including a metallic structure defining a tapered opening having one end positioned adjacent to the focal region and a multilayer structure positioned in the opening, the multilayer structure including a first layer of dielectric material, second and third layers of dielectric material positioned on opposite sides of the first layer, and a fourth layer of dielectric material positioned between the multilayer structure and a wall of the opening.

2. The apparatus of claim 1, wherein the opening includes metal walls positioned at an angle of between 0° and about 120° with respect to each other.

3. The apparatus of claim 1, wherein the opening includes metal walls lying in planes that are substantially normal to a plane of the first waveguide.

4. The apparatus of claim 3, wherein the electromagnetic wave is transverse-electric polarized with the electric field substantially normal to the metal walls in the second waveguide.

5. The apparatus of claim 1, wherein the opening includes metal walls lying in planes that are tilted at an angle of between 0° and about 60° with respect to a plane of the first waveguide.

6. The apparatus of claim 5, wherein the electromagnetic wave is transverse-magnetic polarized with the electric field substantially normal to the metal walls in the second waveguide.

7. The apparatus of claim 1, wherein the first layer comprises a core material of high index of refraction, which includes at least one of silicon, $Cu_2O$, GaP, SiC, diamond, or chalcogenide glasses.

8. The apparatus of claim 1, wherein the fourth layer of dielectric material has a lower index of refraction than that of the first layer.

9. The apparatus of claim 1, wherein the focal region lies within the second waveguide.

10. An apparatus comprising:
    means for focusing an electromagnetic wave to a focal region; and
    a waveguide including a metallic structure defining a tapered opening having one end positioned adjacent to the focal region and a multilayer structure positioned in the opening, the multilayer structure including a first layer of dielectric material, second and third layers of dielectric material positioned on opposite sides of the first layer, and a fourth layer of dielectric material positioned between the multilayer structure and a wall of the opening.

11. The apparatus of claim 10, wherein the opening includes metal walls positioned at an angle of between 0° and about 120° with respect to each other.

12. The apparatus of claim 10, wherein the electromagnetic wave has an electric field substantially normal to walls of the opening.

13. The apparatus of claim 10, wherein the first layer comprises a core material of high index of refraction, which includes at least one of silicon, $Cu_2O$, GaP, SiC, diamond, or chalcogenide glasses.

14. The apparatus of claim 10, wherein the fourth layer of dielectric material has a lower index of refraction than that of the first layer.

15. The apparatus of claim 10, wherein the focal region lies within the second waveguide.

* * * * *